US011556867B2

(12) United States Patent
Subramanian et al.

(10) Patent No.: US 11,556,867 B2
(45) Date of Patent: Jan. 17, 2023

(54) SYSTEM AND METHOD FOR WORKSITE PROJECT TRACKING

(71) Applicant: Caterpillar Inc., Peoria, IL (US)

(72) Inventors: Gautham Subramanian, Peoria, IL (US); Jacob J. McAlpine, Otsego, MN (US)

(73) Assignee: Caterpillar Inc., Peoria, IL (US)

( * ) Notice: Subject to any disclaimer, the term of this patent is extended or adjusted under 35 U.S.C. 154(b) by 283 days.

(21) Appl. No.: 16/654,832

(22) Filed: Oct. 16, 2019

(65) Prior Publication Data

US 2021/0117878 A1    Apr. 22, 2021

(51) Int. Cl.
*G06Q 10/06* (2012.01)
*E01C 19/48* (2006.01)
*G06Q 50/08* (2012.01)

(52) U.S. Cl.
CPC ..... *G06Q 10/0631* (2013.01); *G06Q 10/0639* (2013.01); *E01C 19/48* (2013.01); *G06Q 50/08* (2013.01)

(58) Field of Classification Search
None
See application file for complete search history.

(56) References Cited

U.S. PATENT DOCUMENTS

| | | | |
|---|---|---|---|
| 7,499,842 B2 * | 3/2009 | Grichnik | F02D 41/1401 703/2 |
| 8,306,731 B2 | 11/2012 | Waggaman, III | |
| 9,519,411 B2 | 12/2016 | Geis et al. | |
| 9,685,009 B2 | 6/2017 | Sprock et al. | |
| 2002/0059320 A1 * | 5/2002 | Tamaru | E02F 9/26 |
| 2010/0178107 A1 * | 7/2010 | Braddy | E01C 23/01 404/75 |
| 2011/0148856 A1 * | 6/2011 | Sprock | E02F 9/261 345/419 |

(Continued)

FOREIGN PATENT DOCUMENTS

| | | | |
|---|---|---|---|
| CN | 107273587 | 1/2019 | |
| WO | WO8102799 A1 * | 10/1981 | G07C 3/00 |

(Continued)

OTHER PUBLICATIONS

N. Zingirian and C. Valenti, "Sensor clouds for Intelligent Truck Monitoring," 2012 IEEE Intelligent Vehicles Symposium, 2012, pp. 999-1004, doi: 10.1109/IVS.2012.6232192. (Year: 2012).*

(Continued)

*Primary Examiner* — Shelby A Turner
(74) *Attorney, Agent, or Firm* — Lee & Hayes, PLLC

(57) ABSTRACT

A method includes receiving target data for a paving project corresponding to a work period. The method also includes receiving sensor data from one or more components associated with the paving project, determining a progress value representing progress of the one or more components of the paving project, and determining a threshold progress value for a time period, the time period having a duration that is less than a duration of a work period. The method further includes determining that the progress value is less than the threshold progress value, generating at least one of an alarm or a recommendation, and sending the alarm or the recommendation to an electronic device.

16 Claims, 5 Drawing Sheets

(56) References Cited

U.S. PATENT DOCUMENTS

| | | | |
|---|---|---|---|
| 2012/0288328 A1* | 11/2012 | Minich | E01C 19/004 404/72 |
| 2014/0316837 A1* | 10/2014 | Fosburgh | G06Q 50/08 705/7.22 |
| 2016/0171406 A1* | 6/2016 | Sen | G06Q 10/06375 705/7.23 |
| 2016/0257310 A1* | 9/2016 | Sprock | B60W 40/08 |
| 2016/0292933 A1* | 10/2016 | Sprock | G07C 5/008 |
| 2017/0058467 A1* | 3/2017 | Marsolek | E01C 19/48 |
| 2017/0068933 A1 | 3/2017 | Norton et al. | |
| 2017/0205814 A1* | 7/2017 | Marsolek | G05B 19/41895 |
| 2017/0205999 A1* | 7/2017 | Marsolek | E01C 19/48 |
| 2017/0228108 A1 | 8/2017 | Marsolek | |
| 2018/0218301 A1 | 8/2018 | Shike et al. | |
| 2018/0374009 A1* | 12/2018 | Hunsaker | G06Q 50/02 |
| 2019/0057354 A1* | 2/2019 | McKenzie | G06Q 50/08 |
| 2019/0180433 A1* | 6/2019 | Sasson | G06T 7/001 |
| 2019/0377602 A1* | 12/2019 | Mosca | G06Q 50/08 |
| 2020/0413011 A1* | 12/2020 | Zass | G05D 1/0094 |
| 2021/0348490 A1* | 11/2021 | Wheatley | E21B 43/30 |

FOREIGN PATENT DOCUMENTS

| | | | | |
|---|---|---|---|---|
| WO | WO-2006085877 A1 * | 8/2006 | ....... | G05B 19/41875 |
| WO | 2018130993 | 7/2018 | | |

OTHER PUBLICATIONS

D. J. Harmelink and M. A. Bernal, "Simulating haul durations for linear scheduling," 1998 Winter Simulation Conference. Proceedings (Cat. No. 98CH36274), 1998, pp. 1607-1613 vol. 2, doi: 10.1109/WSC.1998.746036 (Year: 1998).*

L. Song, F. Ramos and K. Arnold, "A framework for real-time simulation of heavy construction operations," 2008 Winter Simulation Conference, 2008, pp. 2387-2395, doi: 10.1109/WSC.2008. 4736346 (Year: 2008).*

R. Akhavian and A. H. Behzdan, "Automated knowledge discovery and data-driven simulation model generation of construction operations," 2013 Winter Simulations Conference (WSC), 2013, pp. 3030-3041, doi: 10.1109/WSC.2013.6721670. (Year: 2013).*

* cited by examiner

SYSTEM AND METHOD FOR WORKSITE PROJECT TRACKING

TECHNICAL FIELD

The present disclosure relates to a paving system. More specifically, the present disclosure relates to a paving system including a control system configured to determine and track paving progress for a paving project.

BACKGROUND

Paving machines, compacting machines/rollers, haul trucks, and other paving equipment are often used to perform a variety of tasks associated with a worksite. For example, one or more haul trucks may be used to transport paving material from a paving material plant to a worksite so that the paving material may be distributed along a work surface of the worksite by one or more paving machines. One or more compaction machines may follow behind the one or more paving machines and may be operable to compact the freshly-laid paving material to a desired density or stiffness. The operation of such machines and others must be coordinated in order to perform paving operations in an efficient manner. However, in some situations, it may be difficult to track the completion progress of multiple machines implemented in a paving project. Therefore, projects are often evaluated upon completion. Thus, foreman or other workers involved with a project lack the ability to evaluate productivity and progress of the project while the project is in process.

An example system for tacking the productivity of machines on a worksite is described in U.S. Pat. No. 8,306,731 (hereinafter referred to as the '731 reference). In particular, the '731 reference describes a system for assessing the productivity of workers employing vehicles at worksites. The '731 reference describes, for example, a system that characterizes vehicle usage into different status categories. Such status categories may be compared against relevant standards to provide a measurement of the productivity of a vehicle. The productivity measurements may be combined with geographical information so as to provide productivity measurements in a geographical context. The '731 reference does not, however, describe tracking progress of a worksite project. For instance, the '731 reference does not determine progress of various paving events of a paving project, or the progress of the project as a whole. As a result, the system described in the '731 reference is not configured to, among other things, provide notifications to foreman and other worksite personnel indicating productivity targets are not being met.

Example embodiments of the present disclosure are directed toward overcoming the deficiencies described above.

SUMMARY

In an example embodiment of the present disclosure, a method includes receiving, with a controller, target data for a paving project corresponding to a work period. The method also includes receiving, with the controller, sensor data from one or more machines associated with the paving project, determining, with the controller and based at least in part on the sensor data, a progress value representing progress of the paving project, determining, with the controller, a threshold productivity value for a time period that is less than the work period, determining, with the controller, that the progress value is less than the threshold progress value. The method further includes generating, with the controller and based at least in part on determining that the progress value is less than the threshold progress value, at least one of an alarm or a recommendation, and sending, with the controller, at least one of the alarm or the recommendation to an electronic device associated with a user.

In another example embodiment of the present disclosure, a paving system includes one or more paving machines configured to pave a surface, one or more haul trucks configured to haul material from a paving material plant to the one or more paving machines at a worksite, and a system controller in communication with at least the one or more haul trucks. In such examples, the system controller is configured to receive target data corresponding to a work period, the target data including an amount of material to be paved for the work period, receive sensor data from at least one of the one or more paving machines, the one or more haul trucks, or the paving material plant, and determine, based at least in part on the sensor data, a progress value representing at least an amount of material that has been paved during at least a portion of the work period. In such examples, the system controller is further configured to determine a threshold productivity value for a time period that is less than the work period, the threshold productivity based at least in part on the progress data and the work period, determine that the progress value is less than the threshold productivity value for the time period, and send, to a device associated with a user, an indication that the progress value is less than the threshold productivity value for the time period.

In a further example embodiment of the present disclosure, a system includes one or more processors, and non-transitory computer-readable media storing computer-executable instructions that, when executed by the one or more processors, cause the one or more processors to perform operations. In such examples, the operations include receiving, from an electronic device associated with a user, input including one or more parameters for a paving project, generating, based at least in part on the one or more parameters, target data for the paving project, and receiving sensor data from one or more machines associated with the paving project. In such examples, the operations further include determining, based at least in part on the sensor data, a progress value representing an amount of the paving project that is complete, determining, based at least in part on the target data, a threshold progress value for a time period, determining that the progress value is less than the threshold progress value, generating a notification indicating that the progress value is less than the threshold progress value, and sending the notification to the electronic device associated with the user.

DETAILED DESCRIPTION

Figure 1:
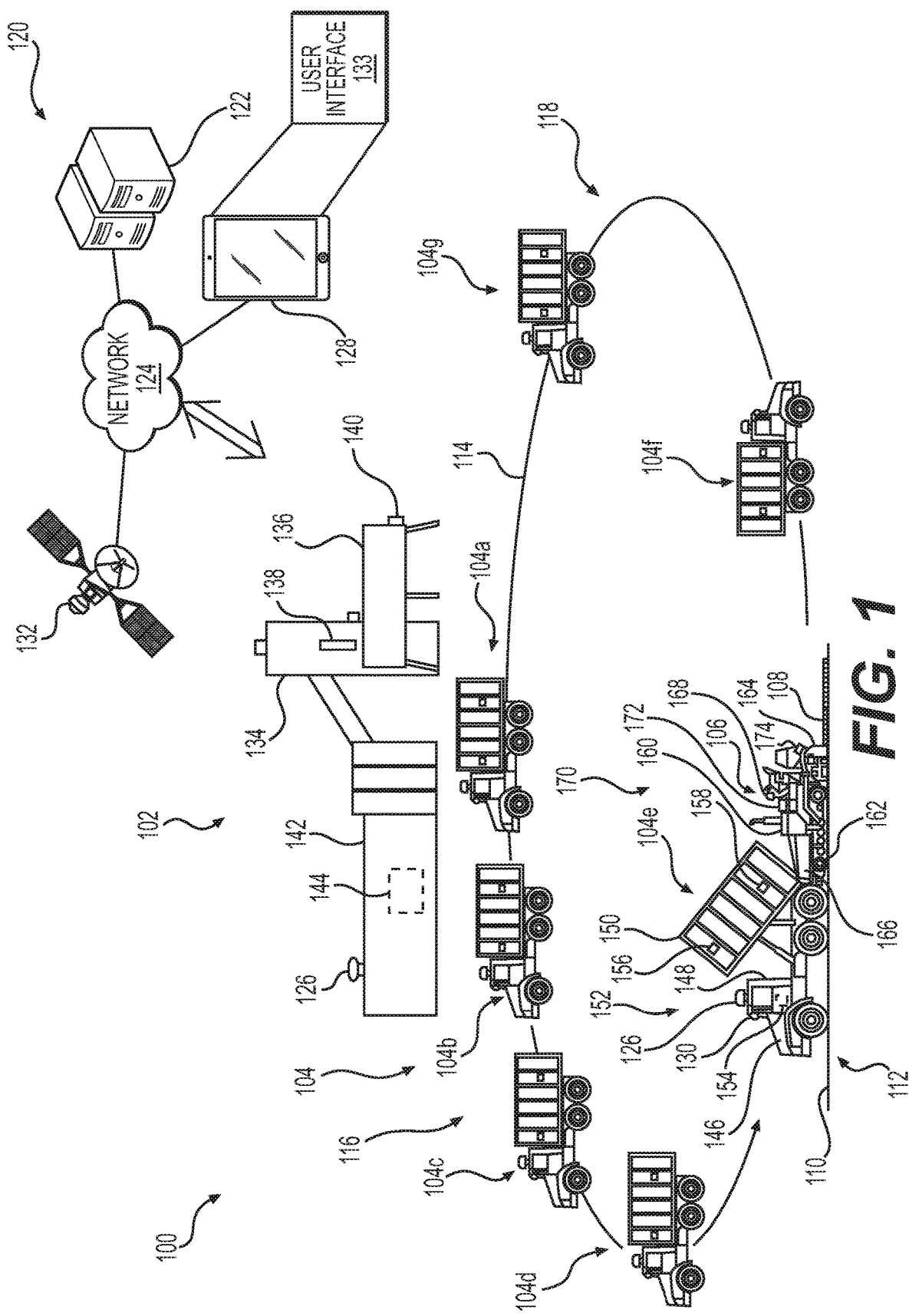
FIG. 1 is a schematic illustrating of a paving system in accordance with an example embodiment of the present disclosure.

Wherever possible, the same reference numbers will be used throughout the drawings to refer to the same or like parts. Referring to FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt (or other material). For instance, one or more haul trucks 104 may be loaded with a desired amount of paving material 108 at the paving material plant 102, and the haul trucks 104 may deliver the paving material 108 to the paving machine 106. The paving machine 106 may deposit the paving material 108 onto a work surface 110 of a worksite 112. In any of the examples described herein, the one or more haul trucks 104 may be configured to travel along at least one travel path 114 extending from the paving material plant 102 to the worksite 112. Such a travel path 114 may include one or more partially or completely formed roads, highways, bridges, service roads, or other surfaces passable by construction and/or paving machines. Such an example worksite 112 may include, for example, a construction site, a road work site, a parking lot, or any other type of job site. Once the one or more haul trucks 104 have delivered the paving material 108 to the worksite 112, the haul trucks 104 may transfer the paving material 108 to a hopper or other component of the paving machine 106, and the paving machines 106 may apply the paving material 108 to and/or otherwise deposit the paving material 108 on the work surface 110 in the form of a substantially flat, substantially smooth paving material 108 mat.

As shown in FIG. 1, an example paving system 100 may include a first haul truck 104a, a second haul truck 104b, a third haul truck 104c, a fourth haul truck 104d, a fifth haul truck 104e, a sixth haul truck 104f, a seventh haul truck 104g (collectively, referred to herein as "haul trucks 104"), and/or one or more additional haul trucks (not shown). In example embodiments, the paving system 100 may include greater than or less than the seven haul trucks 104 shown in FIG. 1. Further, as shown in FIG. 1, the haul trucks 104 may travel sequentially (e.g., one after another), along the travel path 114, from the paving material plant 102 to the worksite 112, and may sequentially return to the paving material plant 102 along substantially the same travel path 114 or along a separate (e.g., different) travel path 114. For example, the haul trucks 104 may deliver paving material 108 to the worksite 112 by sequentially traversing a first portion 116 of the travel path 114 extending from the paving material plant 102 to the worksite 112, and may return to the paving material plant 102 by sequentially traversing a second portion 118 of the travel path 114 extending from the worksite 112 to the paving material plant 102 (or other location).

Additionally, although not illustrated in FIG. 1, it is understood that the paving system 100 may further include one or more other machines, such as one or more compaction machines and/or one or more remixing transfer vehicles. In such examples, the one or more compaction machines may be configured to compact the mat of paving material 108 to a desired density. It is understood that the consistency, density, and/or quality of the mat of paving material may be maximized when the paving machine 106 is controlled to operate without stopping. Accordingly, in order to avoid paving machine stoppages, an arrival time at which an example haul truck 104a is expected to arrive at the worksite 112 may be determined as described in U.S. patent application Ser. No. 16/104,514, entitled "System and Method for Determining Haul Truck Arrival," filed on Aug. 17, 2018, which is incorporated in its entirety by reference. In any of the examples described herein, the determined arrival time at which the haul truck 104 is expected to arrive at the worksite 112 may be used to control the speed, paving rate, and/or other operations of the paving machine 106. For instance, the determined arrival time may be used to reduce the speed and/or paving rate of the paving machine 106 in examples in which the determined arrival time indicates the haul truck 104 is behind schedule and/or will otherwise be delayed in arriving at the worksite 112. As a result, the determined arrival time of the haul truck 104 may be used to avoid stoppages of the paving machine 106. Additionally, and/or alternatively, the paving rate at which the paving machine 106 is working may be increased (reasonably) in order to reduce an amount of time that the haul trucks 104 are waiting at a worksite 112 to dispense the paving material 108 into the paving machine 106 or other machines. Thus, the determined arrival time may be used to maximize the quality of the mat of paving material 108, thereby improving the overall efficiency of the paving system 100.

In example embodiments, the paving material plant 102 may produce paving material 108 such as asphalt from bitumen, aggregate, and other materials or fillers. The paving material 108 is often produced in batches with each batch sorted or held in a separate storage or holding location, such as a silo, until it is loaded into one or more haul trucks 104 at a loading station of the paving material plant 102. Each holding location may be dedicated to storing or holding paving material 108 for a particular worksite 112 and paving material 108 within a particular holding location is periodically loaded into one or more haul trucks 104 for transport to a worksite 112. The characteristics of each batch stored within a holding location may be set based upon the desired characteristics for a particular paving project. For example, the amount of oil and the size of the aggregate may be set based upon the desired characteristics of the paving material 108 and the requirements of each paving project. Each batch of paving material 108 may be periodically or continuously mixed at the holding location and maintained at a desired temperature. The temperature at which the paving material 108 is maintained may be set based upon a desired temperature at which the paving material 108 will be loaded into the haul trucks 104. Such loading temperature may be based upon the desired temperature at which the load will be delivered to the paving machine 106, the ambient temperature of the air, the expected time required for the haul trucks to drive from the paving material plant 102 to the worksite 112 (e.g., to the paving machine 106), as well as any expected or anticipated waiting time for the haul trucks 104 at the worksite 112.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on any of the machines of the paving system 100, at the worksite 112, and/or at a remote command center (not shown). In other examples, the control system 120 and/or the system controller 122 may be located remote from the paving material plant 102 and/or remote from the worksite 112, such as at the remote commend center referred to above. In any of the examples described herein, the functionality of the system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller may comprise a component of the paving system 100, the paving material plant 102, one or more of the haul trucks 104, one or more of the paving machines 106, a component of a separate electronic device (e.g., a mobile phone, a tablet, a laptop computer, etc.), and/or the control system 120.

The system controller 122 may be an electronic controller that operates in a logical fashion to perform operations, execute algorithms, store and retrieve data and/or other desired operations. The system controller 122 may include or access memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the system controller 122 such as power supply circuitry, signal conditioning circuitry, driver circuitry, and/or other types of circuitry.

The system controller 122 may be a single controller or may include more than one controller (such as additional controllers associated with each of the haul trucks 104, paving machines 106, compaction machines (not shown), and/or other machines/components of the paving system 100) configured to control various functions and/or features of the paving system 100. As used herein, the term "controller" is meant in its broadest sense to include one or more controllers, processors, central processing units, and/or microprocessors that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps, look-up tables, neural networks, algorithms, machine learning algorithms, data layers, predictive layers, and/or other components relating to the operating conditions and the operating environment of the paving system 100 that may be stored in the memory of the system controller 122. Each of the data maps noted above may include a collection of data in the form of tables, graphs, and/or equations to maximize the performance and efficiency of the paving system 100 and its operation.

The components of the control system 120 may be in communication with and/or otherwise operably connected to any of the components of the paving system via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines (not shown) and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines, and the system controller 122, as well as to permit communication with other machines and systems remote from the paving material plant 102, haul trucks 104, paving machines 106, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, and/or other components of the paving system 100. For example, machine locations determined by the respective location sensors 130 may be used by the system controller 122 and/or other components of the paving system 100 to determine delivery rates of paving material 108 being delivered to the worksite 112 from the paving material plant 102. For instance, such machine locations may be used by the system controller 122 and/or other components of the paving system 100 to track and determine progress of a paving project at the worksite 112. For example, the system controller 122 and/or other components of the paving system 100 may track an amount of paving material 108 hauled by the haul trucks 104 from the paving material plant 102 to the paving machine 106. The system controller 122 and/or other components of the paving system 100 may also track an amount of paving material 108 that has been paved by the paving machine 106, current and/or historical paving rates, an amount of paving material 108 loaded onto the haul trucks 104, an amount of paving material 108 that is in route to the worksite 112, etc. Such progress data may be compared with target data received by an operator/foreman and/or compared with target data (or target goals) automatically generated by the system controller 122 and/or other components (as will be described further herein below). The system controller 122 and/or other components of the paving system 100 may also generate a user interface 133 that includes, among other things, information indicative of the progress of the paving project and/or the productivity of one or more components of the paving system 100. The system controller 122 may provide the user interface 133 to, for example, the electronic device 128, a controller of the paving machine 106, and/or other components of the paving system 100, via the network 124, for display such that operation of the various components of the paving system 100 can be modified and/or otherwise controlled based at least in part the progress data. In examples in which the paving machine 106, compaction machines, and/or other components of the paving system 100 are operating under autonomous or semi-autonomous control, the speed, steering, paving rate, and/or other functions of such components may be controlled automatically or semi-automatically based at least in part on the progress data.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to the one or more haul trucks 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, the load station 136 may include one or more sensors 140 configured to determine the presence and/or location of one or more haul trucks 104 (e.g., the haul truck 104a shown in FIG. 1), a time at which the haul truck 104a arrived at the load station 136, a time at which the haul truck 104a departed the load station 136, an amount (e.g., a weight) of paving material 108 loaded into the haul truck 104a, and/or other information associated with the haul truck 104a. In some examples, the sensor 140 may comprise a scale or other mass sensor configured to determine the weight of the haul truck 104a upon entering the load station 136, the weight of the haul truck 104a after paving material has been loaded into the haul truck 104a, and/or a change in weight of the haul truck 104a.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102. For example, the various sensors of the paving material plant 102 and/or the paving material plant controller 144 may monitor, sense, determine, record, and/or transmit information indicative of a time at which a particular haul truck 104a enters the paving material plant 102, a time at which the haul truck 104a leaves the paving material plant 102, the amount of paving material 108 loaded into the particular departing haul truck 104a, the destination of the particular haul truck 104a (e.g., the location of the worksite 112) the operator of the haul truck 104a, and/or other information. Such information may be used by, for example, the system controller 122 in any of the progress determinations, productivity determinations, and/or other operations described herein.

In some examples, further information associated with a haul truck 104a may be collected while the particular haul truck 104a is disposed at the paving material plant 102. For instance, each of the haul trucks 104 may have a unique license plate number, a unique truck identification number, a radio frequency identification (RFID) tag, and/or other haul truck identifier that is unique to the respective haul truck 104a. In such examples, a haul truck identifier unique to the respective haul truck 104a may be scanned, observed, and/or otherwise determined by the sensor 140 while the haul truck 104*a* is disposed at the load station 136. Additionally, and/or alternatively, the haul truck identifier unique to the respective haul truck 104*a* may be scanned, observed, and/or otherwise determined by one or more sensors (not shown) associated with the station 142 when the haul truck 104*a* is disposed at the station 142. Additionally, and/or alternatively, paving material plant personnel may scan, observe, and/or otherwise determine the haul truck identifier unique to the respective haul truck 104*a* using one or more hand-held scanners, sensors, or other devices when the haul truck 104*a* is disposed at the load station 136, the station 142, and/or at other locations within the paving material plant 102. In any such examples, the sensors, hand-held scanners, or other devices described above may provide the determined haul truck identifier to the paving material plant controller 144, together with a time stamp indicating the time at which the haul truck identifier was determined, in one or more signals transmitted via the network 124.

As noted above, the haul trucks 104 of the paving system 100 may be operable to transport paving material 108 between the paving material plant 102 and one or more of the paving machines 106 located at the worksite 112. Each of the haul trucks 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each of the haul trucks 104 may include a truck control system 152 and a truck controller 154 generally similar or identical to the control system 120 and the system controller 122, respectively. The truck control system 152 and the truck controller 154 may be located on a respective one of the haul trucks 104 and may also include components located remotely from the respective one of the haul trucks 104 such as on any of the other machines of the paving system 100, at the paving material plant 102, or at a command center (not shown). The functionality of truck controller 154 may be distributed so that certain functions are performed on the respective one of the haul trucks 104 and other functions are performed remotely. In some examples, the truck control system 152 and/or the truck controller 154 may enable autonomous and/or semi-autonomous control of the respective one of the haul trucks 104.

The haul truck 104 may also be equipped with a plurality of sensors connected to and/or otherwise in communication with the truck controller 154 and/or with the system controller 122. Such sensors may be configured to provide data indicative (directly or indirectly) of various operating parameters of the respective one of the haul trucks 104, systems associated with the respective one of the haul trucks 104, and/or the worksite 112 and/or other environment in which the respective one of the haul trucks 104 is operating. In any of the examples described herein, such sensors may comprise components of the truck control system 152, the control system 120, and/or the paving system 100, generally. For example, as noted above, each of the haul trucks 104 may be equipped with a location sensor 130 configured to sense, detect, and/or otherwise determine a location and/or orientation of a respective one of the haul trucks 104. The location sensor 130 may include a plurality of individual sensors that cooperate to generate and provide location signals to the truck controller 154 and/or to the system controller 122 indicative of the location and/or orientation of a respective one of the haul trucks 104. In some examples, the location sensor 130 may be fixed to the cab 148, the chassis 146, and/or any other component of the haul truck 104. In other examples, however, the location sensor 130 may be removably attached to a respective one of the haul trucks 104 and/or disposed within, for example, the cab 148 of a haul truck 104*a* during operation of the haul truck 104*a*. In some examples, each of the haul trucks 104 may also include a load sensor 156 configured to sense, measure, and/or otherwise determine the load or amount of paving material 108 disposed within the dump body 150. The haul trucks 104 may further include a temperature sensor 158 configured to sense, measure, and/or otherwise determine the temperature of the load (e.g., paving material 108) within the dump body 150.

With continued reference to FIG. 1, the paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul trucks 104 or another supply machine, and a conveyor system which transfers paving material 108 from the hopper 166 to the screed 164. The paving machine 106 may further include an operator console having a display 168, such as an LCD display. The display 168 may be mounted to the frame 160 for viewing by an operator. In an example embodiment, the display 168 may be configured to display the user interface 133 described above. As will be described below, an example user interface 133 may include, among other things, visual indicia of the paving material plant 102, visual indicia of the worksite 112, identifiers associated with one or more of the respective haul trucks 104, productivity of one or more machines of the paving system 100, progress of the paving project, target data associated with the paving project, etc. An example user interface 133 may, additionally or alternatively, include information indicative of projected productivity and progress based on target data for a paving project, current paving rate, location and load data of one or more haul trucks 104, etc.

In still further examples, the user interface 133 may include a map of the worksite 112 including icons or other visual indicia representing the work surface 110, the paving machine 106, one or more of the haul trucks 104, and/or other components of the paving system 100. The user interface 133 may also include a map of the area surrounding the worksite 112. For instance, such a map may include lines, icons, markers, or other visual indicia representing the paving material plant 102, the worksite 112, the travel path 114 extending from the paving material plant 102 to the worksite 112, one or more of the haul trucks 104 disposed on the travel path 114, one or more additional roads, or other items. In additional examples, the user interface 133 may include information associated with a respective one of the haul trucks 104, paving material information, and/or other information typically included in a paving ticket generated at the paving material plant 102. Further, it is understood that such user interfaces 133 may be displayed via the display 168, the electronic device 128, and/or via any other displays associated with the system controller 122, the paving material plant controller 144, or other components of the control system 120.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive progress data indicating progress and/or productivity for the paving project and/or target data from the system controller 122. In an autonomous or semi-autonomous mode of operation, the paving machine controller 172 and/or the paving machine control system 170, generally, may be operable to cause the paving machine 106 to travel at a desired paving machine speed while depositing paving material 108 on the work surface 110 based at least in part on the received progress data and/or target data. Such operation and/or control of the paving machine 106 may ensure that a paving project stays on schedule.

The paving machine 106 may also be equipped with a plurality of sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. In some examples, the temperature sensor 174 may comprise an optical temperature sensor such as an infrared camera, whereas in other embodiments the temperature sensor 174 may comprise a non-optical sensor such as a digital or analog thermometer. While the temperature sensor 174 is shown mounted on the screed 164 such that it can determine the temperature of paving material 108 deposited on the work surface 110 and located behind the screed 164 as paving progresses, the present disclosure is not limited to this configuration. For example, in other embodiments the temperature sensor 174 may be mounted at a different location on the paving machine 106 and may be configured to sense paving material temperature within paving machine 106.

Figure 2:
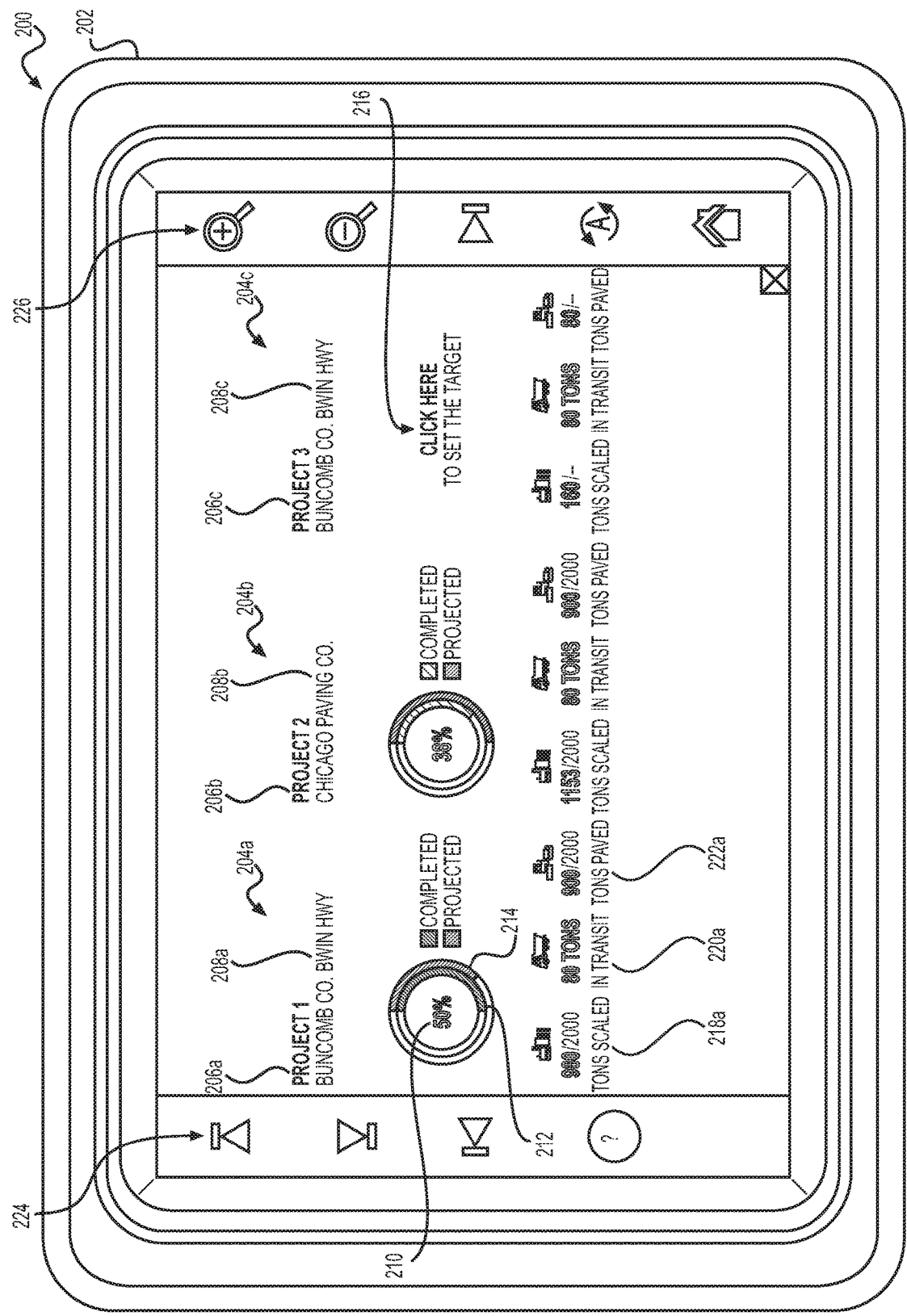
FIG. 2 is an illustration of an example user interface generated by the paving system shown in FIG. 1.

FIG. 2 illustrates an example user interface 200 of the present disclosure. The example user interface 200 may comprise any of the user interfaces 133 described above with respect to FIG. 1, and the user interface 200 of FIG. 2 is shown as being displayed on an LCD display, a CRT display, a touch-screen (e.g., a capacitive/touch-sensitive) display device, and/or other display 202. In some examples, the display 202 may comprise a display of the electronic device 128, a display associated with the system controller 122, a display associated with the paving material plant controller 144, and/or a display associated with one or more other components of the control system 120. In further examples, the display 202 may comprise a display of the paving machine 106 that is similar to and/or the same as the display 168 described above with respect to FIG. 1.

As shown in FIG. 2, an example user interface 200 may include information 204 indicative of project status for one or more paving projects 206. In some examples, the information 204 may include sensor data received from one or more components of the paving system 100. Additionally, and/or alternatively, the information 204 may include a progress value that is generated from the sensor data. For example, the information 204 may include a progress value that is generated from sensor data from one or more of the paving material plant, the paving machine, the haul trucks, etc. In some examples, such information 204 may include indicators 204a, 204b, 204c, etc. indicative of respective paving project statuses. While FIG. 2 depicts information 204a-204c indicative of a project status for three different paving projects 206a-206c, it is understood that an example user interface 200 may provide any number of information indicators 204 for any number of paving projects 206. In some examples, the information 204a for a paving project 206a (also referred to herein as a "first project 206a") may include a corresponding paving project identifier (ID) 208a. The paving project ID 208a may include information indicative of a location of the paving project 206a (i.e., the location of the worksite 112), information indicative of an operator of the paving project 206a, and/or any other unique information or identifier either automatically generated or set by a user such as a foreman or operator. In some examples, the information 204a may include information indicative of a completion percentage 210 representing an amount of the paving project 206a that has been completed compared to target data. The completion percentage 210 may also be presented as a completion bar 212 proximate to the completion percentage 210. As mentioned previously, the completion percentage 210 may be based in part on target data and/or one or more parameters set by a user and/or determined by the paving system 100. For example, a user (e.g., a foreman) may input one or more parameters including, but not limited to, a total amount of paving material 108 necessary (or desired) to be paved to complete the paving project 206a, working time necessary to complete the paving project 206a, a projected start time/date, a projected completion time/date, etc. In some examples, the paving system 100 may generate the target data based in part on the one or more parameters. For example, a user may input a total amount of paving material 108 to be paved to complete a paving project and a target completion date. From such information, the system controller 122 may calculate target data for the paving project such as a suggested paving rate, a daily amount of paving material 108 to be paved each day of the project, an amount of work hours to be completed daily, a quantity of haul trucks to be implemented for the paving projects, etc. For example, the system controller 122 may determine, based in part on the target completion date, an amount of work days prior to the completion date, an amount of work hours to be completed, etc. From such a determination, the system controller 122 may then calculate an amount of paving material 108 to be paved each day, each hour, etc. For example, the system controller 122 may divide a total amount of paving material to be paved for the paving project by the total amount of work days and/or work hours to be completed to finish the paving project. In some examples, the system controller 122 may calculate the target data based in part on historical data of one or more paving projects.

The completion percentage 210 may represent an actual amount of any one or more of the parameters mentioned previously that have been completed by the paving system. That is to say, the completion percentage 210 and/or the completion bar 212 may represent an amount of the paving project 206a that is complete (i.e., an amount of paving material 108 that is paved, work time that has been completed, etc.). In some examples, the completion percentage 210 may represent an actual amount of paving material 108 that has been paved out of a total amount of paving material 108 to be paved for the entire project (i.e., (actual amount paved/total amount to pave) multiplied by 100). Such a completion percentage 210 may be represented at a project level, a daily level, and/or a crew/shift level (among others). In some examples, a user may be able to toggle between different completion metrics showing a project level completion percentage, a daily completion percentage, and/or a crew/shift level completion percentage. In some examples, a user may input total project level target data and/or daily target data and the paving system 100 may track progress of the paving system 100 compared to the target data. Additionally, and/or alternatively, the user may input one or more parameters (e.g., a total amount of paving material 108 to be paved, a start date, a completion date, etc.) and the paving system 100 may automatically determine the target data at a project level, daily, and/or crew/level. Such a process will be described further herein below. In such a process, a user may input such parameter(s) using input fields in the user interface 200.

In some examples, the target data may be represented by a projected completion bar 214 (also referred to herein as a "projected bar"). The projected bar 214 may be displayed adjacent the completion bar 212 and may represent an amount of the paving project 206a that should be completed at a specific time such as a current time or an end of a specified time period (an hour, day, week, etc.). Displaying the completion bar 212 adjacent to the projected bar 214 gives the user a visual indication of their progress relative to the target data. Thus, a user, such as a foreman, is easily and quickly able to determine if the paving project 206a is ahead of schedule, on time, or behind schedule. In some examples, the user interface 200 may display such information using other icons (e.g., pie-chart completion, bar graph, etc.) or numerical indicia. The projected bar 214 may represent the target data at a project level, daily level, and/or crew/shift level, thereby giving the foreman multiple levels of detail and project tracking. As shown in FIG. 2, the progress status 204a for the first paving project 206a indicates that the first paving project 206a is ahead of the target data. However, the progress status 204b for a second paving project 206b indicates that the second paving project 206b is behind the target data and thus, behind schedule. In some examples, the completion percentage 210, the completion bar 212, and/or other portions of the progress status 204 may be colored, patterned, shaded, hatched, and/or otherwise displayed depending on whether the progress status 204 indicates that the paving project 206 is ahead of schedule, on time, or behind schedule for one or more parameters of the target data, thereby giving the user a visual indication of the current progress status 204 of each paving project 206. If the target data for a paving project 206c has not been set by a user and/or calculated by the paving system 100, the user interface 200 may present a selectable control 216 to set the target data. In some examples, selecting the control 216 may present one or more parameters that a user may provide input for and the target data may be calculated by the paving system 100 based in part on the one or more parameters. Additionally, and/or alternatively, selecting the control 216 may cause the system controller 122 and/or other paving system 100 components to calculate target data based in part on received data from the user.

As further shown in FIG. 2, the progress status 204a for the paving project 206a may further include progress data for one or more components of the paving system 100. For example, the progress status 204a may display scale information indicative of progress data 218a (also referred to herein as "scale data") for the paving material plant 102. Such scale data 218a may be represented as an amount of paving material 108 that has been scaled at a paving material plant 102. As mentioned previously, the paving material plant 102 may communicate with the control system 120, the system controller 122, and/or other components of the paving system 100. The paving material plant 102 may communicate scale data 218a such as an amount of paving material 108 weighed and/or loaded onto the haul trucks 104. Such scale data 218a may include a weight of paving material weighed and/or loaded at the paving material plant 102, a volume of paving material 108 loaded at the paving material plant 102, etc. In some examples, the scale data 218a may be represented as a quantity scaled out of a total quantity to be scaled at the project level, daily, or crew/shift level. Similar to the completion percentage 210 described above, the scale data 218a may be colored, patterned, shaded, hatched and/or otherwise displayed depending on whether the scale data 218a is ahead of, substantially equal to, or behind the target data.

Furthermore, the progress status 204a may display information indicative of an amount of paving material 108 that is in transit on the haul trucks 104. Such information may be displayed as transit data 220a. The transit data 220a may include data received from the paving material plant 102 and/or the haul trucks. Such data may indicate an amount of paving material 108 that has been loaded onto the haul trucks 104 but has not yet been loaded into the paving machine 106. For example, the transit data 220a may indicate that the haul trucks 104 are between the paving material plant 102 and the worksite 112. In some examples, the progress status 204 may further include information indicative of an amount of paving material 108 that has been paved on the work surface 110. Such information may be displayed as paving data 222a. The paving data 222a may include data received from the paving machine 106 and/or the haul trucks 104 indicating that the paving material 108 has been paved. Similar to the completion percentage described above 210, the paving data 222a may be colored, patterned, shaded, hatched, and/or otherwise displayed depending on whether the paving data 222a is ahead of, substantially equal to, or behind the target data. While FIG. 2 depicts the progress status 204a as including scale data 218a, transit data 220a, and paving data 222a, the progress status 204a may be configured to display any data received from the paving system 100.

In any of the example embodiments described herein, the user interface 200 may comprise an interactive user interface configured to receive one or more inputs from a user via the display 202, and to provide one or more outputs via the display 202 corresponding to such inputs. In such examples, one or more of the progress status 204, paving projects 206, paving project identifiers 208, completion percentage 210, scale data 218, transit data 220, pave completion data 222, etc. may be configured to receive one or more inputs from a user via the display 202, and to provide various information and/or other outputs via the display 202 corresponding to such inputs. The user interface 200 may also include one or more dedicated controls configured to receive inputs via the display 202. For example, the user interface 200 may include dedicated controls that may provide, display, and/or otherwise output via the display 202 various information typically associated with a paving ticket, with the paving material plant 102, with the worksite 112, and/or with various components of the paving system 100. The user interface 200 may also include various other controls 224, 226 configured to operate, access, and/or control various other features of the user interface 200 and/or various other operations of the paving system component with which the display 202 is associated.

Figure 3:
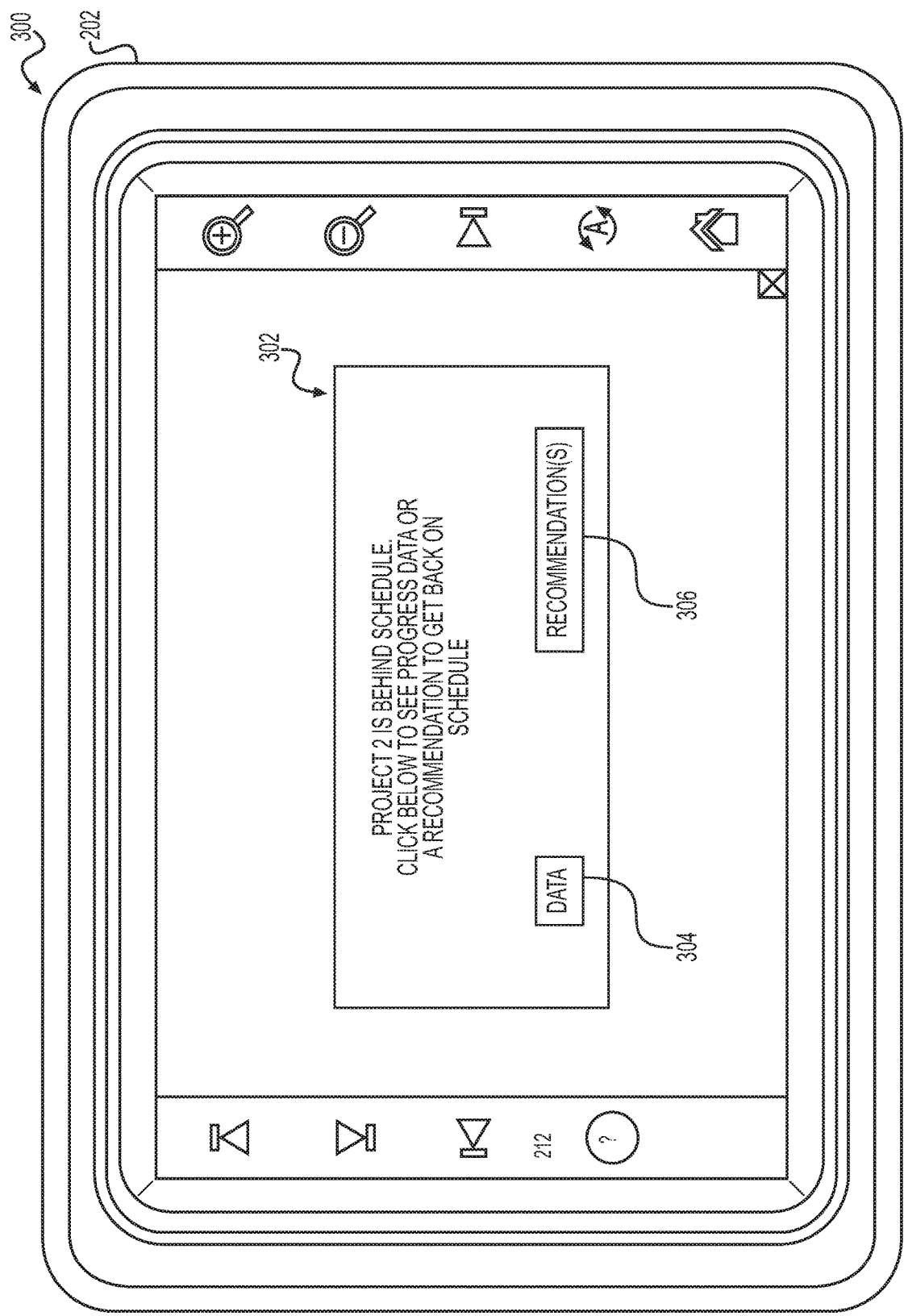
FIG. 3 is an illustration of another example user interface generated by the paving system shown in FIG. 1.

FIG. 3 illustrates another example user interface 300 of the present disclosure provided by the display 202. In some examples, the user interface 300 may be provided by the display 202 at least partially in response to the paving system 100 determining that the progress status 204 indicates that the paving project 206 is behind the target data. Such a process will be described further herein below. Additionally, and/or alternatively, the paving system 100 may provide the user interface at least partially in response to determining that the progress status 204 is below a threshold that is less than the target data for one or more parameters. As shown in FIG. 3, the user interface 300 may information indicative of the project status 204 of the paving project 206. For example, the user interface 300 may provide a dialog box 302 notifying the user that the project status 204 indicates that the paving project 206 is behind the target data for one or more parameter. In some examples, the dialog box 302 may include text notifying the user which parameter(s) are behind the target data. For example, the dialog box 302 may include text describing that the amount of paving material 108 that has been scaled at the paving material plant 102 is below a threshold amount of paving material 108 needed to maintain an on-time schedule of the paving project 206. Additionally, and/or alternatively, the dialog box 302 may include a first selectable control 304 that, when selected by a user, may present progress data to the user. In some examples, the progress data presented to the user may include the data representing components and/or parameters of the paving system 100 that are behind the target data. Additionally, and/or alternatively, the progress data presented to the user when the control 304 is selected may include additional data in order to provide the user a survey of the components and/or parameters of the paving system 100.

The dialog box 302 may further include a second selectable control 306 that, when selected by a user, may cause one or more recommendations to be presented on the display 202. The one or more recommendations may include data describing which component(s) of the paving system 100 may be causing the paving project 206 to be behind schedule. For example, the paving system 100 may identify one or more inefficiencies in the paving system 100 and may present the one or more inefficiencies to the user on the display 202. Additionally, and/or alternatively, the paving system 100 may analyze the data received during the paving project 206, the target data, and/or historical data of other paving projects to identify one or more strategies to overcome the one or more inefficiencies. These strategies may be presented to the user on the display when the user selects the control 306. In some examples, the user interface 300 may include additional dialog boxes or selectable controls notifying the user that the paving project 206 is behind schedule.

Figure 4:
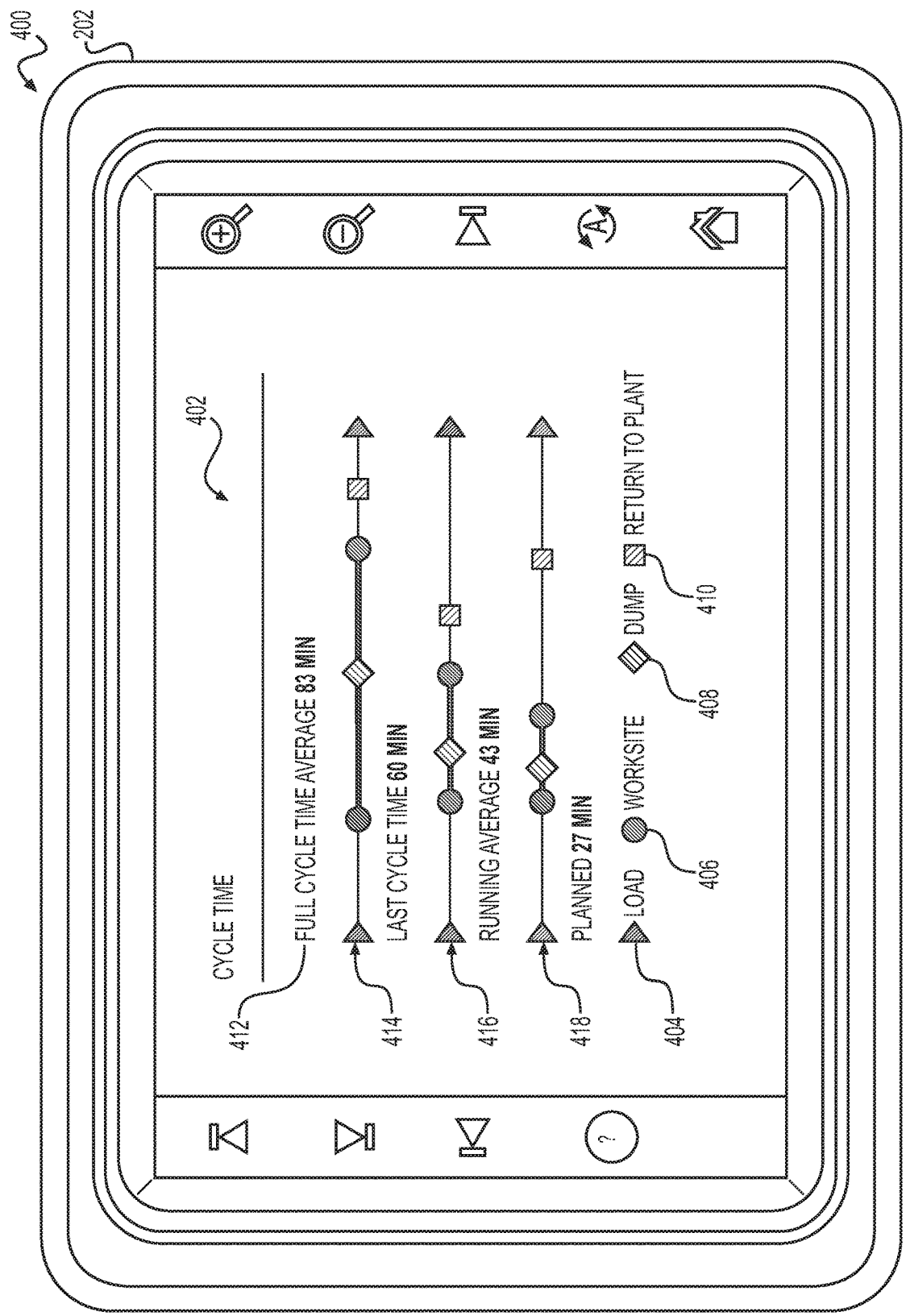
FIG. 4 is an illustration of a further example user interface generated by the paving system shown in FIG. 1

FIG. 4 illustrates another example user interface 400 of the present disclosure provided by the display 202. In some examples, the user interface 400 may be provided by the display at least in response to a user selecting the first selectable control 304. The user interface 400 may include information 402 indicative of cycle time for the one or more haul trucks 104 of the paving system 100. For example, the information 402 may include data representing an amount of time that passes for one or more haul trucks to be loaded with paving material 108 at the paving material plant 102, to reach the worksite 112, to dump the paving material 108 into the paving machine 106 and/or other location, return to the paving material plant 102, and be loaded with paving material 108 another time. As shown in FIG. 4, the user interface 400 may include indicia representing locations of the paving system 100. For example, the user interface 400 may include a load indicium 404 representing a time at which a haul truck 104 is loaded with paving material 108. The user interface 400 may include a worksite indicium 406 representing a time at which the haul truck reaches the worksite 112. The user interface 400 may further include a dump indicium 408 representing a time at which the haul truck 104 dumps the paving material 108 in the paving machine 106 and/or other location. The user interface 400 may also include a return to plant indicium 410 representing a time at which the haul truck returns to the paving material plant 102 to receive additional load(s) of paving material 108. In some examples, the user interface 400 may include additional indicia representing other events within the paving system 100. While FIG. 4 is described as representing information 402 regarding cycle time for one or more haul trucks 104, the user interface 400 may generate other cycle time information for other components of the paving system 100. For example, the user interface 400 may provide information indicating cycle time for the creation of paving material 108 at the paving plant 102, one or more events of the paving machine 106 (e.g., stoppages, load events, etc.), compaction cycles etc.

In some examples, the user interface 400 may include information 412 indicative of a full cycle time average. The full cycle time average 412 may represent an average of the time it takes for a haul truck to be loaded with paving material 108, reach the worksite 112, dump the paving material 108 into the paving machine 106, return to the paving material plant 102, and receive another load of paving material 108. Such a process may be referred to herein as a "cycle." The full cycle time average 412 may represent an average calculated for one or more haul trucks making one or more cycles. The user interface 400 may further include information 414 indicative of a last cycle time. In such an example, the last cycle time 414 may include a timeline with indicia representing one or more events of the cycle that was last completed by a haul truck. The user interface 400 may further include information 416 indicative of a running average. The running average 416 may represent an average amount of time a haul truck is at the worksite 112. The user interface 400 may further include information 418 indicative of a planned cycle time. The planned cycle time 418 may represent an estimated amount of time that a user and/or the paving system 100 calculates to plan the length of time necessary to complete a cycle and/or a portion thereof.

Figure 5:
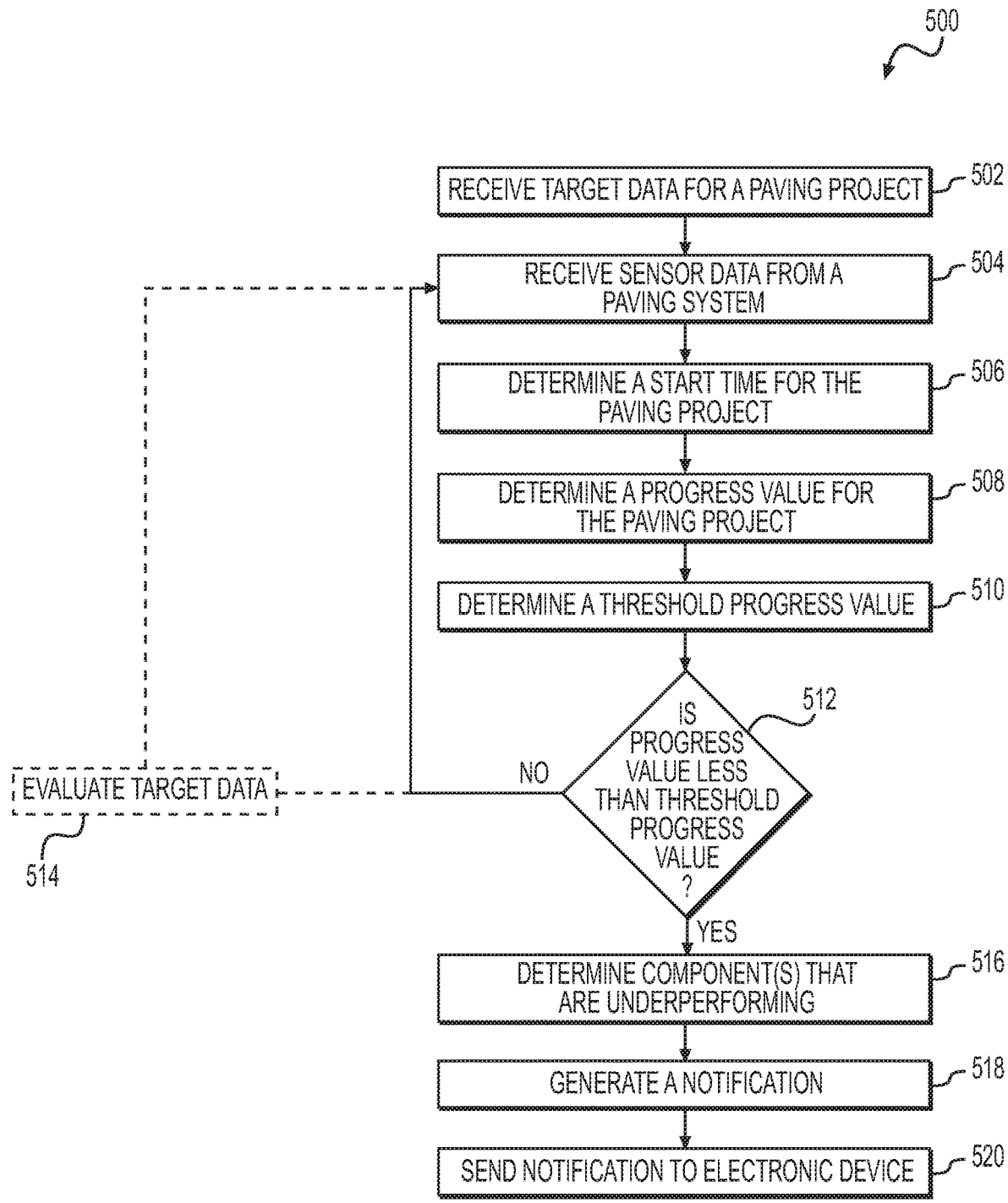
FIG. 5 is a flow chart depicting an example method of determining and tracking progress for a paving project with the paving system shown in FIG. 1.

FIG. 5 illustrates a flow chart depicting an example method 500 of worksite 112 project tracking for one or more paving projects 206. The example method 500 is illustrated as a collection of steps in a logical flow diagram, which represents operations that may be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 144, the truck controller 154, the paving machine controller 172, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 500 is described with reference to the paving system 100, the control system 120, the paving material plant 102, and/or other items shown in FIGS. 1-4. In particular, although any part of and/or the entire method 500 may be performed by the truck controller 154, the paving machine controller 172, the paving material plant controller 144, the electronic device 128, and/or other components of the paving system 100, unless otherwise specified the method will be described below with respect to the system controller 122 for ease of description.

With reference to FIG. 5, at 502 the system controller 122 may receive target data for a paving project 206. In some examples, a user may input the target data via an electronic device 128. Such target data may include at least one of a total amount of paving material 108 to be paved in order to complete the paving project 206, a start date for the paving project 206, a completion date for the paving project 206, an amount of work hours necessary to complete the paving project 206, an estimated daily start time, an actual daily start time, a number of work hours per day, a number of days that paving will occur, etc. The user may input target data at a project level (e.g., a total amount of paving material 108 to be paved for the entire paving project 206), a daily level (e.g., a total amount of paving material 108 to be paved each day of the paving project 206), and/or a crew/shift level (e.g., a total amount of paving material 108 to be paved during a shift and/or by a specific work crew). Thus, the system controller 122 may receive target data for the paving project 206 corresponding to a work period. The work period may include a period of time corresponding to the entire paving project 206, a daily work period, and/or shorter increments of a work period. In some examples, a user may input target data at one or more of the levels described above and the system controller 122 may determine target data at the remaining level(s). For ease of reference, such target data may be referred to herein as project level target data, daily target data, and crew/shift level target data, respectively. Additionally, and/or alternatively, in some examples, the system controller 122 may receive one or more parameters from input of a user via the electronic device 128 instead of the target data. The one or more parameters may include but are not limited to dimensions of the work surface 110 to be paved, a total amount of paving material 108 to be paved, a start date, a completion date, etc. Once the system controller 122 has received the one or more parameters, the system controller 122 and/or other components of the paving system 100 may automatically generate the target data for the user. Such generated target data may be generated at a project level, daily level, and/or crew/shift level as described above. In some examples, the system controller 122 may analyze historical data for one or more previous paving projects to generate the target data for the user. The system controller 122 may also analyze environmental data associated with the worksite 112 and/or analyze one or more components of the paving system 100 to determine statuses of the one or more components and determine productivity/efficiency of the one or more components. The system controller 122 may use the historical data to determine weighting factors, constants, and/or modifiers in one or more algorithms, lookup tables, data curves, neural networks, and/or other components of the system controller 122 to determine the target data and/or track the progress of the paving project. For example, the system controller 122 may use a feature reduction and/or feature selection algorithm to identify one or more factors that impact the progress of the paving project the most. In such an example, the feature reduction and/or feature selection algorithm may include Spearman's rank correlation between one or more factors, recursive feature elimination (RFE), principal component analysis (PCA), matrix factorization, diversity selection based on latent space from a matrix factorization, a Relief algorithm, or a combination thereof.

At 504, the system controller 122 may receive sensor data from one or more components of the paving system 100. For example, the system controller 122 may receive sensor data from the paving machine 106, the haul trucks 104, the paving material plant 102, etc. In some examples, the system controller 122 may receive sensor data from the one or more paving machines 106 indicating an amount of paving material 108 that has been paved on the work surface 110 and/or a paving rate at which the one or more paving machines 106 are paving the work surface 110. The system controller 122 may receive sensor data from the haul trucks 104 indicating an amount of paving material 108 that has been transported from the paving material plant 102 to the worksite 112. In some examples, the system controller 122 may generate a geofence around the worksite 112 and/or around the paving machine 102. In such an example, the system controller 122 may track movement of the haul trucks 104 as they enter the geofence of the worksite 112 and/or the paving machine 106. For example, the system controller 122 may determine an amount of time that the haul trucks 104 are on the worksite 112 prior to depositing the paving material 108 into the paving machine 106. The system controller 122 may also determine an amount of time the haul trucks spend in the geofence of the worksite 112 and/or the paving machine 106 and may use the determined time as an indication that the haul trucks 104 have entered the worksite 112 and/or have deposited the paving material 108 into the paving machine 106. In some examples, the system controller 122 may determine that a threshold amount of time has passed since the haul trucks 104 entered the worksite 112 and may assume that the haul trucks 104 have deposited the paving material 108 in the paving machine 106. For example, the system controller 122 may determine that a haul 104 has entered the worksite 112 and remained on the worksite 112 for more than three hours. In such a situation, the system controller 122 may assume that the haul truck 104 has deposited the paving material 108 in the paving machine 106. Additionally, and/or alternatively, the system controller 122 may send a request to the display 168 of the paving machine 106 requesting the operator of the machine to confirm that one or more haul trucks 104 have deposited the paving material 108 in the paving machine. The system controller 122 may also receive load data from the load station sensor 140 of the paving material plant 102 indicating an amount of paving material 108 that has been loaded on the haul tucks 104 and/or an amount of time spent loading the paving material 108 on the haul trucks 104.

At 506, the system controller 506 may determine a start time for the paving project. The start time may include a start date and time for the entire paving project 206 and/or it may include a daily start time. For example, the system controller 122 may determine a date and time on which the paving project 206 began. Additionally, and/or alternatively, the system controller 122 may determine a start time for the paving project 206 each day that the paving project 206 is still pending. In some examples, the start time may be determined from the sensor data. For example, the system controller 122 may determine from the sensor data a time at which the first haul truck 104 was loaded with paving material 108 at the paving material plant 102. Furthermore, the system controller 122 may receive an electronic ticket from the paving material plant 102 indicating a time that a haul truck was loaded, an identification of the haul truck 104, an amount of paving material 108 loaded onto the haul truck 104, etc. Typically, daily project tracking may be conducted for a 24-hour period of time starting at 12:00 A.M. and ending at 11:59 P.M. However, determining a daily start time enables a user to track progress of the paving project 206 more accurately. Furthermore, the system controller 122 may use the daily start time to determine and/or adjust the daily target data and/or the crew/shift level target data. In some examples, the start time may not affect the project level target data. However, the system controller 122 may determine that the project level target data may need to be adjusted based in part on the daily start time and patterns thereof. In some examples, a user may indicate a projected start time and/or the system controller 122 may determine a suggested start time. In such an example, the system controller 122 may compare the actual start time with the projected start time and/or the suggested start time and send, to the electronic device 128 associated with the user, an indication whether the current work day started early, late, or substantially on time (i.e., within approximately 15, 25, 30 minutes, etc.). In an example where the system controller 122 determines that the start time was later than the projected start time and/or the suggested start time, the system controller 122 may automatically update the target data in order to reach the target data for the day. For example, the system controller 122 may adjust an amount of paving material 108 that needs to be paved every hour in order to reach the target data for the day and/or the paving project 206.

At 508, the system controller 122 may determine a progress value representing progress of the paving project 206. In some examples, the progress value may include the completion percentage 210 described above with respect to FIG. 2. The progress value may be determined at a project level, daily level, and/or a crew/shift level. The progress value may be a value that the system controller 122 generates from analyzing the sensor data and/or the start time. For example, the progress value may be a composite value that represents the overall progress of paving system 100 for the paving project 206. In such an example, the system controller 122 may determine weighting factors, constants, and/or modifiers to apply to one or more components for use in one or more algorithms, lookup tables, data curves, neural networks, and/or other components of the system controller 122 to determine the progress value. In some examples, the system controller 122 may analyze the paving system 100 to determine which one or more components are impacting the progress of the paving project 206 the most. As mentioned previously, in such an example, the system controller 122 may use a feature reduction and/or feature selection algorithm to determine which one or more components have the greatest impact on the progress of the paving project 206. The system controller 122 may weight such components higher than others in determining the progress value. For example, the system controller 122 may implement a feature reduction algorithm to determine that the haul trucks 104 are having the greatest impact on the progress of the paving project 206. In such an example, the system controller 122 may weight the progress of the haul trucks 104 greater than the amount of paving material 108 paved by the paving machine 106. In some examples, the progress value may represent progress of less than all the components of the paving system 100. For example, the progress value may represent progress of the haul trucks 104 for the paving project 206. Additionally, and/or alternatively, the system controller 122 may determine a progress value for each applicable component of the paving system 100. In some examples, the progress value may represent a percentage of completion for one or more components of the paving system. The progress value may further include a productivity value and/or an efficiency value of one or more components. Furthermore, the progress value may be calculated for a projected progress value based on current sensor data. That is to say, the system controller 122 may determine from the sensor data a progress value representing progress that will be made under the current performance of the paving system. In such an example, the system controller 122 may be able to determine that a paving project 206 will get behind schedule, prior to the paving project 206 falling behind allowing a foreman to make changes to the paving system 100 prior to the paving project getting behind schedule.

At 510, the system controller 122 may determine a threshold progress value for the paving project 206. Similar to the progress value described above, the threshold progress value may represent progress of one or more components of the paving system 100. In some examples, the threshold progress value may be set by a user. Additionally, and/or alternatively, the threshold progress value may be determined by the system controller 122 and/or other components of the paving system 100. The threshold progress value may be based in part on the time of day and/or the amount of time that has passed since the start of the paving project 206. For example, the system controller 122 may determine that at 1:00 P.M. the paving system 100 will have needed to pave 1000 tons of paving material 108 to reach the daily target data and/or the project level target data. Such a threshold progress value may be determined by diving a total amount of paving material by a total amount of work hours to be completed for the paving project and/or may be determined by dividing a daily amount of paving material to be paved by a daily amount of work hours to determine an amount of paving material to be paved each hour of a work day. The threshold progress value may be determined for any given time period (e.g., weekly threshold progress value, daily threshold progress value, hourly threshold progress value, etc.). In some examples, the threshold progress value may be determined at least in part on the start time for a particular day of the paving project 206. In some examples, the system controller 122 may determine multiple threshold progress values. In such an example, the system controller 122 may use the multiple threshold progress values to determine whether and/or types of alarms/notifications to send the user indicating that the paving project 206 is behind schedule.

At 512, the system controller 122 may determine whether the progress value is less than the threshold progress value.

If at 510, the system controller 122 determines multiple threshold progress values, the system controller 122 will determine whether the progress value is less than one or more of the threshold progress values. For example, the system controller 122 may determine that the progress value is greater than one or more threshold progress values, that the progress value is less than a first threshold progress value but greater than a second threshold progress value, that the progress value is less than a first threshold progress value and a second progress value, etc.

If at 512, the system controller 122 determines that the progress value is not less than the threshold progress value, the system controller 122 may, at 504, receive sensor data. In such an example, the system controller 122 may continue to monitor the progress of the paving project 100. In some examples, if the system controller 122 has previously determined a start time, the system controller 122 may not determine a start time a second time and thus, may skip one or more of the previous steps. Optionally, if at 512 the system controller 122 determines that the progress value is not less than the threshold progress value and/or determines that the progress value is greater than the threshold progress value, the system controller 122 may evaluate and/or adjust the target data at 514. For example, if at 512 the system controller 122 determines that the progress value indicates that the paving project 206 is ahead of schedule, the system controller 122 may evaluate and/or adjust the target data accordingly. Such adjustments may include reducing a paving rate, reducing a number of days necessary to complete the paving project 206, reducing a number of crews/shifts for a day and/or for a project work period, etc. However, in some examples, the system controller 122 may omit 514 and may continue to monitor the sensor data at 504.

However, if at 512, the system controller 122 determines that the progress value is less than the threshold progress value, the system controller 122 may determine, based in part on the sensor data, the one or more parameters, the target data and/or historical data associated with the paving project 206 and/or other paving projects, one or more components of the paving system 100 that are underperforming compared to the target data at 516. For example, the system controller 122 may determine, based in part on sensor data, that the paving machine 106, the haul trucks 104, and/or the paving material plant 102 may be underperforming compared to the target data for the paving project 206. For example, the system controller 122 may determine that the haul trucks are spending too much time waiting at the paving material plant 102 to be loaded with paving material 108. In another example, the system controller 122 may determine that there are too few haul trucks 104 in the paving system 100 and are creating delays for the paving machine 106. In such examples, the system controller 122 may compare the sensor data of one or more components with their respective target data to determine whether the one or more components are reaching the target data. If the system controller 122 determines that a component(s) is not reaching the target data for that specific component (i.e., the haul trucks 104 have not hauled the target amount of paving material 108 from the paving material plant 102 to the worksite 112), the system controller 122 may analyze the sensor data to determine one or more factors that are causing the component(s) to not reach the target data. For example, the system controller 122 may determine from historical data that the haul trucks typically spend less than one hour at a paving material plant 102 being loaded with paving material 108. However, the system controller 122 may determine from the sensor data that the haul trucks 104 are spending approximately two hours at the paving material plant 102 and may determine that such a wait time is causing delays in the paving system 100. As mentioned previously, the system controller 122 may use a feature selection and/or feature reduction algorithm to determine which component(s) have the greatest impact on the paving project 206. Thus, the system controller 122 may determine one or more components of the paving system 100 that are inhibiting progress of the paving project 206.

At 518, the system controller 122 may generate a notification (or an alarm) indicating that the progress value is less than a threshold progress value. The notification may include text, audio, video, etc. indicating that the progress value is less than the threshold progress value. If the system controller 122 determines multiple threshold progress values, the notification may include an indication of which threshold progress value the progress value is less than. In some examples, the notification may include multiple levels of urgency based on which of the multiple threshold progress values the progress value is less than. The notification may indicate a time period for which the progress value is less than the threshold progress value. As described above with respect to FIG. 3, the notification may include one or more selectable controls that, when selected, may display progress data and/or recommendation(s) to the user. The notification one or more recommendations may be based at least in part on determining the one or more components of the paving system 100 that are inhibiting progress of the paving project 206 and/or the paving system 100. For example, the system controller 122 may determine that there are too few haul trucks 104 in the paving system and may recommend adding one or more haul trucks 104 to the paving system. In some examples, the system controller 122 may utilize historical data to generate one or more recommendations that may be implemented in the paving system 100 in order to reach the target data. For example, the system controller 122 may implement one or more machine learning techniques to determine which components, individually or in combination, are likely to inhibit progress of the paving system 100. For example, the system controller 122 may use a feature reduction and/or feature selection algorithm to identify one or more factors and/or components that impact the progress of the paving project the most and or will impact the paving project. In such an example, the feature reduction and/or feature selection algorithm may include Spearman's rank correlation between one or more factors, recursive feature elimination (RFE), principal component analysis (PCA), matrix factorization, diversity selection based on latent space from a matrix factorization, a Relief algorithm, or a combination thereof. In addition, through the one or more machine learning techniques, the system may learn the type of recommendations that are most effective when implemented in the paving system 100 in order to reach the target data.

At 520, the system controller 122 may send the notification to the electronic device 128, various control systems of the paving system 100, and/or other components of the paving system 100. As described above, the notification may use selectable controls that, when selected, cause progress data and/or the recommendation(s) to be presented on the display 202. In some examples, the notification may cause an electronic device 128 to output audio data, video data, text data, etc. to notify a user that the paving system 100 progress is below the threshold progress value.

In some examples, the determined arrival time of the one or more haul trucks 104 may be used to maximize the quality of the mat of paving material 108, thereby improving the overall efficiency of the paving system 100. Still further, in some examples, machine locations determined by the respective location sensors 130 may be used by the system controller 122 and/or other components of the paving system 100 to determine delivery rates of paving material 108 being delivered to the worksite 112 from the paving material plant 102. The system controller 122 and/or other components of the paving system 100 may also track an amount of paving material 108 that has been paved by the paving machine 106, current and/or historical paving rates, an amount of paving material 108 loaded onto the haul trucks 104, an amount of paving material 108 that is in route to the worksite 112, etc. In examples in which the paving machine 106, compaction machines, and/or other components of the paving system 100 are operating under autonomous or semi-autonomous control, the speed, steering, paving rate, and/or other functions of such components may be controlled automatically or semi-automatically based at least in part on the progress data. In some examples, the various sensors of the paving material plant 102 and/or the paving material plant controller 144 may monitor, sense, determine, record, and/or transmit information indicative of a time at which a particular haul truck 104a enters the paving material plant 102, a time at which the haul truck 104a leaves the paving material plant 102, the amount of paving material 108 loaded into the particular departing haul truck 104a, the destination of the particular haul truck 104a (e.g., the location of the worksite 112) the operator of the haul truck 104a, and/or other information. Such information may be used by, for example, the system controller 122 in any of the progress determinations, productivity determinations, and/or other operations described herein. In some examples, a user may be able to toggle between different completion metrics showing a project level completion percentage, a daily completion percentage, and/or a crew/shift level completion percentage. Furthermore, the paving system 100 may analyze the data received during the paving project 206, the target data, and/or historical data of other paving projects to identify one or more strategies to overcome the one or more inefficiencies.

INDUSTRIAL APPLICABILITY

The present disclosure describes systems and method for tracking and determining worksite 112 progress of a paving project 206. Such systems and methods may be used to track and/or evaluate the progress of a paving project 206 while the paving project 206 is in process. For example, such systems and methods may enable a system controller 122 of a control system 120 to determine whether a paving project 206 is on schedule according to target data for the paving project 206. In such examples, the system controller 122 may receive sensor data from one or more components of the paving system 100 to monitor the progress of the paving project. The system controller 122 may provide such information to a display 202 of an electronic device 128. For example, the system controller 122 may generate a user interface 200 that includes such information and may provide the user interface 200 to the electronic device 128. As a result, a foreman of the worksite 112 paving project 206 may be able to determine the progress of the paving project 206 in near real time.

As noted above with respect to FIGS. 1-4, an example method 500 of determining worksite 112 progress of a paving project 206 may include receiving or determining target data for the paving project 206. Such a method 500 may also include receiving sensor data from one or more components of the paving system 100. In some examples, the system controller 122 may determine a progress value representing progress of the paving project 206. Such an example method 500 may also include determining a threshold progress value based in part on a time period for the paving project 206. In such examples, the system controller 122 may determine whether the progress value is less than the threshold value. The system controller 122 may generate a notification to send to the user indicating that the progress value is less than the threshold progress value.

As described above, the system controller 122 may also generate a user interface 200 that includes information indicative of the progress of one or more paving projects 206. The system controller 122 may provide the user interface 200 to the electronic device 128. As a result, a foreman is able to determine the progress of the paving project 206 in near real time. In some examples, the system controller 122 may also provide recommendations to the foreman that may be implemented in the paving system 100 in order to reach the target data for the paving project 206.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, for configuring a controller to perform a set of operations, the set of operations comprising:
   receiving target data for a paving project corresponding to a work period;
   determining, based on the target data, a planned start time for the work period;
   receiving sensor data from one or more components associated with the paving project;
   determining, using one or more machine learning algorithms and based at least in part on the sensor data, a weighting factor for individual components of the one or more components, wherein the weighting factor represents a relative impact that the individual components have on progress of the paving project;
   determining, using the one or more machine learning algorithms and based at least in part on the weighting factor for the individual components, a progress value representing progress of the one or more components;
   determining a threshold progress value for a time period, wherein:
      the time period includes a duration that is less than a duration of the work period, and
      the threshold progress value is determined based at least in part on the planned start time, the threshold progress value representing a threshold amount of material to be paved for the time period;
   receiving ticket data indicating a time when a first haul truck was loaded with paving material;
   determining, based at least in part on the ticket data, that an actual start time for the work period is later than the planned start time;
   determining, using the one or more machine learning algorithms and based at least in part on the actual start time, an updated threshold progress value;
   determining that the progress value is less than the updated threshold progress value;

generating, based at least in part on determining that the progress value is less than the updated threshold progress value, at least one of an alarm and a recommendation;

sending the alarm and the recommendation to an electronic device associated with a user; and causing at least one component of the one or more components to increase a paving rate associated with the paving project based at least in part on determining that the progress value is less than the updated threshold progress value.

2. The method according to claim 1, wherein the target data includes an amount of material to be paved by the one or more components during the work period.

3. The method according to claim 1, wherein the sensor data includes at least one of load data indicating an amount of material loaded onto one or more haul trucks or paving data indicating an amount of material paved by one or more paving machines.

4. The method according to claim 1, further comprising:
based at least in part on determining that the progress value is less than the updated threshold progress value, determining, using the one or more machine learning algorithms and based at least in part on the sensor data and the weighting factor for the individual components, one or more components that are underperforming compared to the target data, wherein
the recommendation includes one or more strategies to increase the progress value of the one or more components.

5. The method according to claim 1, wherein determining the progress value for the time period includes determining a completion percentage representing an amount of material paved for the work period.

6. The method according to claim 1, wherein determining the planned start time includes receiving, from a user, the planned start time for the work period or determining, using the one or more machine learning algorithms and based at least in part on the target data, the planned start time for the work period.

7. The method according to claim 1, further comprising determining, with the controller and based at least in part on the sensor data, a paving rate at which one or more paving machines are paving a work surface, wherein the recommendation includes one or more suggestions to increase the paving rate.

8. The method according to claim 1, further comprising:
generating a graphical user interface on a display of the electronic device associated with the user;
displaying a progress bar on the graphical user interface, the progress bar indicative of the progress value;
determining, using the one or more machine learning algorithms and based at least in part on the weighting factor for the individual components, a projected progress value representing projected progress of the one or more components of the paving project; and
displaying a projected progress bar on the graphical user interface and adjacent the progress bar, the projected progress bar indicative of the projected progress value.

9. The method according to claim 1, wherein the at least one component operates autonomously or semi-autonomously, and the controller is communicatively coupled to the at least one component to control operation of the at least one component.

10. The method according to claim 1, further comprising sending a notification to the electronic device, the notification indicating that the updated threshold progress value has been determined based at least in part on the actual start time being later than the planned start time.

11. A system, comprising:
one or more processors; and
non-transitory computer-readable media storing computer executable instructions that, when executed by the one or more processors, cause the one or more processors to perform operations comprising:
receiving, from an electronic device associated with a user, input including one or more parameters for a paving project;
generating, using one or more machine learning algorithms and based at least in part on the one or more parameters, target data for the paving project;
determining, using the one or more machine learning algorithms and based at least in part on the target data, a planned start time for the paving project;
receiving sensor data from one or more machines associated with the paving project;
determining, using the one or more machine learning algorithms and based at least in part on the sensor data, a weighting factor for individual machines of the one or more machines, wherein the weighting factor represents a relative impact that the individual machines exhibit on an amount of the paving project that is complete;
determining, using the one or more machine learning algorithms and based at least in part on the weighting factor for the individual machines, progress data for the one or more machines representing the amount of the paving project that is complete;
determining, based at least in part on the target data and the planned start time, a threshold progress value for a time period, the threshold progress value representing an amount of material to be paved for the time period;
receiving ticket data indicating a time when a haul truck was loaded with paving material;
determining, based at least in part on the ticket data, that an actual start time for the paving project is later than the planned start time;
determining, using the one or more machine learning algorithms and based at least in part on the actual start time, an updated threshold progress value;
determining that the progress value is less than the updated threshold progress value;
generating a notification indicating that the progress value is less than the updated threshold progress value;
sending the notification to the electronic device associated with the user; and
causing at least one machine of the one or more machines to increase a paving rate associated with the paving project based at least in part on determining that the progress value is less than the updated threshold progress value.

12. The system according to claim 11, wherein the one or more parameters for the paving project include at least one of a size of a surface to be paved, a total weight of material to be paved, a start date for the paving project, or a completion date for the paving project.

13. The system according to claim 11, wherein the target data includes at least one of a daily start time, a paving rate, a daily work duration, or a daily amount of material to be paved.

14. The system according to claim 11, the operations further comprising:

based at least in part on determining that the progress value is less than the updated threshold progress value, determining, based at least in part on the progress data, a first machine of the one or more machines that is underperforming compared to the target data; and generating one or more recommendations to meet the target data for the first machine, wherein the notification includes the one or more recommendations, the one or more recommendations including at least one recommendation associated with an individual machine having a highest weighting factor.

15. The system according to claim 11, wherein determining the actual start time includes receiving, from a paving material plant or one or more haul trucks, load data indicating the actual start time for a work day.

16. The system according to claim 11, wherein the notification includes project level progress data, daily progress data, and crew level progress data.

\* \* \* \* \*